(12) United States Patent
Nakai

(10) Patent No.: US 10,546,522 B2
(45) Date of Patent: Jan. 28, 2020

(54) APPARATUS AND METHOD FOR ADJUSTING DISPLAY PARAMETERS AND DISPLAY APPARATUS

(71) Applicant: BOE Technology Group Co., Ltd., Beijing (CN)

(72) Inventor: Tadashi Nakai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/324,737

(22) PCT Filed: Dec. 25, 2015

(86) PCT No.: PCT/CN2015/098918
§ 371 (c)(1),
(2) Date: Jan. 9, 2017

(87) PCT Pub. No.: WO2017/028447
PCT Pub. Date: Feb. 23, 2017

(65) Prior Publication Data
US 2017/0221403 A1  Aug. 3, 2017

(30) Foreign Application Priority Data

Aug. 19, 2015 (CN) .......................... 2015 1 0511085

(51) Int. Cl.
*G09G 3/20* (2006.01)
*G06F 3/0484* (2013.01)
(Continued)

(52) U.S. Cl.
CPC ....... *G09G 3/2003* (2013.01); *G06F 3/04847* (2013.01); *G06F 3/1423* (2013.01);
(Continued)

(58) Field of Classification Search
None
See application file for complete search history.

(56) References Cited

U.S. PATENT DOCUMENTS 5,754,222 A * 5/1998 Daly ........................ G09G 5/02
348/184
5,838,396 A 11/1998 Shiota et al.
(Continued)

FOREIGN PATENT DOCUMENTS

CN       1444193 A       9/2003
CN     102103829 A       6/2011
(Continued)

OTHER PUBLICATIONS

International Search Report and Written Opinion of International Application No. PCT/CN2015/098918, dated May 13, 2016, 9 pages.
(Continued)

*Primary Examiner* — Sarah Le
(74) *Attorney, Agent, or Firm* — Westman, Champlin & Koehler, P.A.

(57) ABSTRACT

The embodiments of the present disclosure disclose an apparatus and method for adjusting display parameters and a display apparatus. According to the embodiments of the present disclosure, the apparatus for adjusting display parameters comprises: an input unit configured to receive first display parameters from a first display and receive second display parameters from a second display; a control unit configured to obtain reference display parameters according to the first display parameters, compare the reference display parameters with the second display parameters, and adjust the second display parameters according to a comparison result; and an output unit configured to output (Continued)

the adjusted second display parameters to the second display as display parameters of the second display.

14 Claims, 7 Drawing Sheets

(51) Int. Cl.
*G06F 3/14* (2006.01)
*G09G 3/00* (2006.01)
*G09G 5/10* (2006.01)

(52) U.S. Cl.
CPC ............... *G09G 3/006* (2013.01); *G09G 5/10* (2013.01); *G09G 2320/0626* (2013.01); *G09G 2320/0666* (2013.01); *G09G 2320/0673* (2013.01); *G09G 2320/08* (2013.01)

(56) References Cited

U.S. PATENT DOCUMENTS

| | | | |
|---|---|---|---|
| 6,556,238 B1* | 4/2003 | Abe | H04N 17/02 348/180 |
| 7,098,902 B2 | 8/2006 | Tamura | |
| 8,525,752 B2 | 9/2013 | Pinzauti et al. | |
| 8,525,753 B2 | 9/2013 | Lazzaro et al. | |
| 8,700,992 B1 | 4/2014 | Sedov | |
| 8,708,884 B1* | 4/2014 | Smyth | A61M 21/00 600/27 |
| 8,803,762 B2 | 8/2014 | Lazzaro et al. | |
| 8,830,140 B2 | 9/2014 | Lazzaro et al. | |
| 8,884,840 B2 | 11/2014 | Sugiyama | |
| 8,952,980 B2 | 2/2015 | Hansen et al. | |
| 9,215,487 B2 | 12/2015 | Kasahara et al. | |
| 2004/0150732 A1* | 8/2004 | Yamanaka | H04N 9/045 348/272 |
| 2011/0148833 A1 | 6/2011 | Luo et al. | |
| 2013/0147776 A1* | 6/2013 | Lazzaro | G09G 5/005 345/207 |
| 2015/0035993 A1* | 2/2015 | James | H04N 17/04 348/189 |
| 2016/0165229 A1* | 6/2016 | Kao | H04N 17/04 348/189 |

FOREIGN PATENT DOCUMENTS

| | | |
|---|---|---|
| CN | 102270445 A | 12/2011 |
| CN | 102376294 A | 3/2012 |
| CN | 103026712 A | 4/2013 |
| CN | 103165098 A | 6/2013 |
| CN | 105047177 A | 11/2015 |
| JP | 2012-47843 A | 3/2012 |
| JP | 2012-220671 A | 11/2012 |

OTHER PUBLICATIONS

English translation of Box No. V of the Written Opinion for the International Searching Authority for International Application No. PCT/CN2015/098918, 2 pages.

First Office Action, including Search Report, for Chinese Patent Application No. 201510511085.4, dated Mar. 1, 2017, 15 pages.

Second Office Action for Chinese Patent Application No. 201510511085.4, dated Aug. 8, 2017, 11 pages.

Third Office Action from Chinese Patent Application No. 201510511085.4, dated Nov. 14, 2017, 14 pages.

* cited by examiner

GAMMA CHARACTERISTIC (INPUT AND OUTPUT CHARACTERISTICS) (REPRESENTED BY A LINEAR AXIS)

APPARATUS AND METHOD FOR ADJUSTING DISPLAY PARAMETERS AND DISPLAY APPARATUS

CROSS-REFERENCE TO RELATED APPLICATIONS

This application is a section 371 national stage application of international application no. PCT/CN2015/098918, filed 25 Dec. 2015, which has not yet published, and claims priority to the Chinese application no. 201510511085.4 filed on 19 Aug. 2015, which is incorporated herein by reference in their entirety.

TECHNICAL FIELD

The present disclosure relates to the field of screen display, and more particularly, to an apparatus and method for adjusting display parameters and a display apparatus.

BACKGROUND

With progress of communication technology, users' display requirements for display devices are increasingly high. Traditionally, an experienced professional technician is required to adjust a picture quality of a display. This usually requires the technician to adjust the picture quality while watching a picture, so that the picture quality of the display to be adjusted is close to a quality of a standard display which is already produced as much as possible. The traditional manner of manually adjusting a display picture quality needs a professional technician, and is slow and subjective.

Therefore, how to automatically adjust display parameters of a display device becomes a technical problem to be solved in the art.

SUMMARY

Embodiments of the present disclosure provide an apparatus and method for adjusting display parameters and a display apparatus.

According to an aspect of the embodiments of the present disclosure, there is provided an apparatus for adjusting display parameters, comprising:
an input unit configured to receive first display parameters from a first display and receive second display parameters from a second display;
a control unit configured to obtain reference display parameters according to the first display parameters, compare the reference display parameters with the second display parameters, and adjust the second display parameters according to a comparison result; and
an output unit configured to output the adjusted second display parameters to the second display as display parameters of the second display.

Preferably, the control unit comprises a storage apparatus having a lookup table stored therein, wherein the lookup table associatively records a correspondence relationship between the reference display parameters and the first display parameters.

Preferably, the reference display parameters comprise at least one of luminance, a white point color temperature, a Gamma characteristic curve, a contrast, and chroma.

Preferably, the output unit comprises an image engine configured to apply the adjusted second display parameters to the second display.

Preferably, the control unit comprises a test pattern generation section configured to generate corresponding test patterns according to parameters to be adjusted and transmit the test patterns to the first display and the second display, and
the control unit further comprises a picture quality adjustment control section configured to obtain the reference display parameters according to feedback information for the test patterns from the first display and adjust the second display parameters according to a comparison between the feedback information corresponding to the test patterns and the reference display parameters from the second display.

According to another aspect of the embodiments of the present disclosure, there is provided a display apparatus, comprising:
a display; and
an apparatus for adjusting display parameters, including:
an input unit configured to receive first display parameters from a standard display; a control unit configured to obtain reference display parameters according to the first display parameters, compare the reference display parameters with second display parameters of the display, and adjust the second display parameters according to a comparison result; and an output unit configured to apply the adjusted second display parameters to the display as display parameters of the display.

According to a further aspect of the embodiments of the present disclosure, there is provided a method for adjusting display parameters, comprising steps of:
receiving first display parameters from a first display and receiving second display parameters from a second display;
obtaining reference display parameters according to the first display parameters, comparing the reference display parameters with the second display parameters, and adjusting the second display parameters according to a comparison result; and
outputting the adjusted second display parameters to the second display as display parameters of the second display.

Preferably, the method further comprises a step of associatively recording a correspondence relationship between the reference display parameters and the first display parameters.

Preferably, the reference display parameters comprise at least one of luminance, a white point color temperature, a Gamma characteristic curve, a contrast, and chroma.

Preferably, corresponding test patterns are generated according to parameters to be adjusted and the test patterns are transmitted to the first display and the second display; and the reference display parameters are obtained according to feedback information for the test patterns from the first display and the second display parameters are adjusted according to a comparison between the feedback information corresponding to the test patterns and the reference display parameters from the second display.

BRIEF DESCRIPTION OF THE DRAWINGS

The accompanying drawings are used to provide a further understanding of the present disclosure and constitute a part of the specification. The accompanying drawings are used to explain the present disclosure together with the following detailed description and are not intended to limit the present disclosure. In the accompanying drawings.

DETAILED DESCRIPTION

In order to make the purposes, technical solutions, and advantages of the embodiments of the present disclosure more clear and obvious, the embodiments of the present disclosure will be further described in detail below in conjunction with specific embodiments with reference to the accompanying drawings. Obviously, the embodiments as described are merely a part of the embodiments of the present disclosure and are not intended to limit the present disclosure. All other embodiments obtained by those skilled in the art based on the embodiments of the present disclosure without any creative labor should belong to the scope protected by the present disclosure.

Figure 1:
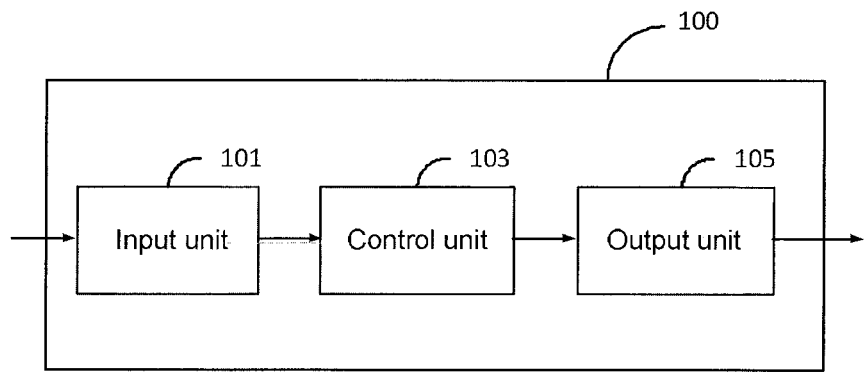
FIG. 1 is a block diagram of an apparatus for adjusting display parameters according to an embodiment of the present disclosure.

FIG. 1 illustrates a diagram of an apparatus 100 for adjusting display parameters according to an embodiment of the present disclosure. As shown in FIG. 1, the apparatus 100 for adjusting display parameters according to an embodiment of the present disclosure may comprise:

an input unit 101 configured to receive first display parameters from a first display (not shown) and receive second display parameters from a second display (not shown);

a control unit 103 configured to obtain reference display parameters according to the first display parameters, compare the reference display parameters with the second display parameters, and adjust the second display parameters according to a comparison result; and an output unit 105 configured to output the adjusted second display parameters to the second display as display parameters of the second display.

Figure 2:
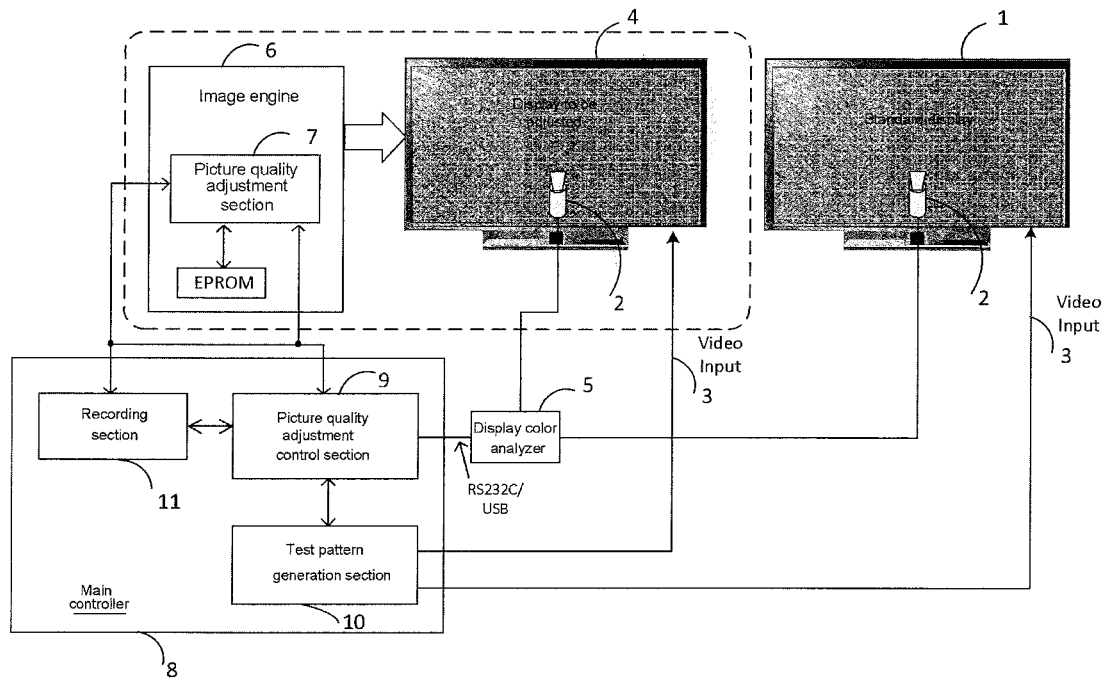
FIG. 2 is an operational schematic diagram of an apparatus for adjusting display parameters according to another embodiment of the present disclosure.

FIG. 2 is a diagram of an apparatus for adjusting display parameters according to another embodiment of the present disclosure. As shown in FIG. 2, as an example of the first display, a standard display 1 has an image with a standard picture quality displayed thereon. The standard display 1 is connected to an optical measurement probe 2, and receives a video input 3 from the apparatus 100 for adjusting display parameters according to an embodiment of the present disclosure. As an example of the second display, a display to be adjusted 4 is connected to another optical measurement probe 2 and receives the video input 3 from the apparatus 100 for adjusting display parameters.

The apparatus 100 for adjusting display parameters according to an embodiment of the present disclosure may comprise a display color analyzer 5 configured to measure various luminance and/or chroma, wherein the display color analyzer 5 may be connected to the standard display 2 and the display to be adjusted 4 respectively through the respective optical measurement probes 2; a main controller 8 configured to obtain reference display parameters according to various display parameters from the standard display 1, compare the reference display parameters with respective display parameters from the display to be adjusted 4 to obtain display adjustment parameters suitable for the display to be adjusted 4; and an image engine 6 configured to set display parameters of the display to be adjusted 4 according to the display adjustment parameters from the main controller 8.

Specifically, the main controller 8 may comprise a test pattern generation section 10 configured to generate test patterns required when a picture quality is adjusted, for example, a test pattern required for necessary on-screen display, and a test pattern required for measurement of a white point color temperature. The test patterns generated by the test pattern generation section 10 are input to the standard display 1 and the display to be adjusted 4 as the video input 3 respectively, for use in subsequent operations. The main controller 8 may comprise a picture quality adjustment control section 9 configured to control the overall operation of adjustment of the picture quality and control the test pattern generation section 10 to generate the test patterns. The picture quality adjustment control section 9 may be connected to the display color analyzer 5 to receive various display parameters from the standard display 1 and the display to be adjusted 4, process the received display parameters from the standard display 1 to obtain one or more reference display parameters, and compare the reference display parameters with the respective display parameters from the display to be adjusted 4 to obtain display adjustment parameters suitable for the display to be adjusted 4. Preferably, the main controller 8 may further comprise a recording section 11 configured to record the reference display parameters obtained by the picture quality adjustment control section 9. Preferably, the recording section 11 may comprise a Lookup Table (LUT) in which a correspondence relationship between the display parameters of the standard display 1 and the reference display parameters is recorded in advance. The picture quality adjustment control section 9 may process the display parameters of the standard display 1 in advance to obtain corresponding reference display parameters and record them into the LUT with a certain data structure (such as arrangement and association arrangement etc.) When used, the corresponding reference display parameters may be directly read from the recording section 11, thereby improving the processing speed.

The image engine 6 may comprise a picture quality adjustment section 7 configured to modify a picture quality of an image displayed on the display to be adjusted 4 according to the display adjustment parameters from the picture quality adjustment control section 9. Preferably, the image engine 6 may further comprise an Electrically Programmable Read-Only Memory (EPROM) configured to store the display adjustment parameters. Preferably, the image engine 6 may directly receive the display adjustment parameters from the picture quality adjustment control section 9 or may also receive the display adjustment parameters from the recording section 11, which is not limited in the present disclosure.

It will be understood by those skilled in the art that according to a preferred embodiment of the present disclosure, the display color analyzer 5 and the image engine 6 may be separate components. In this case, the recording section 11 and the picture quality adjustment control section 9 in the main controller 8 may be connected to the image engine 6 through an external bus. The picture quality adjustment control section 9 may be connected to the display color analyzer 5 through RS232C or a USB etc. The display color analyzer 5 according to an embodiment of the present disclosure may be implemented using an existing display color analyzer, and similarly, the image engine 6 according to an embodiment of the present disclosure may be implemented using an existing image engine. In addition, the display color analyzer 5 and/or the image engine 6 may also be integrated with the main controller 8 or the display to be adjusted 4, which is not limited in the present disclosure.

Figure 3:
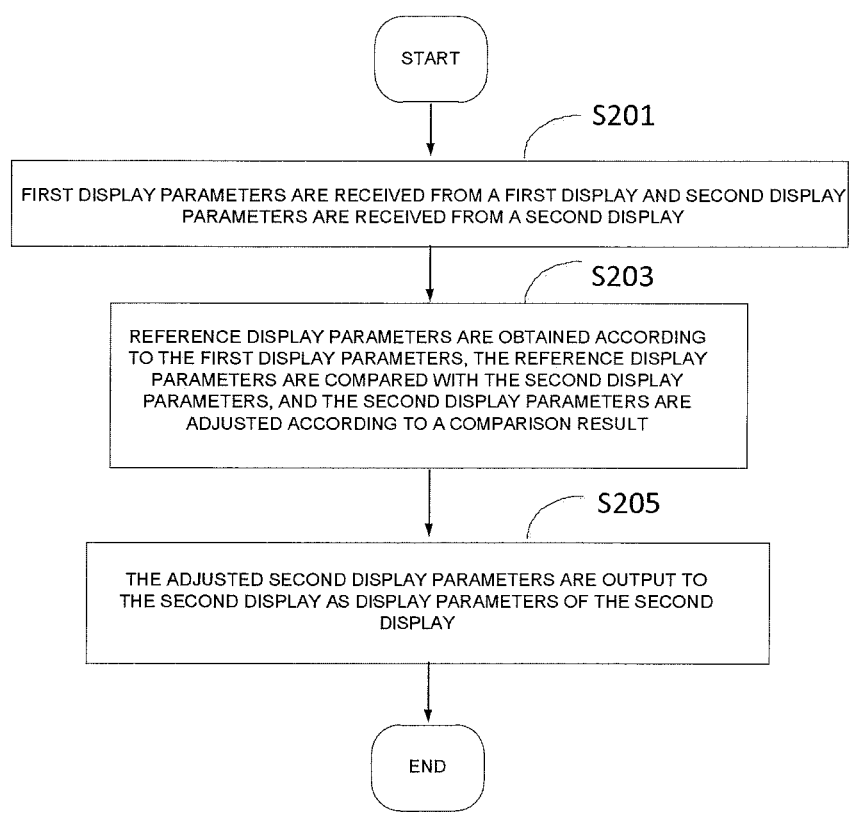
FIG. 3 is a flowchart of a method for adjusting display parameters according to an embodiment of the present disclosure.

A process flow of a method 200 for adjusting display parameters according to an embodiment of the present disclosure will be described below with reference to FIG. 3. As shown in FIG. 3, the method 200 for adjusting display parameters according to an embodiment of the present disclosure may comprise the following steps.

In step S201, first display parameters are received from a first display and second display parameters are received from a second display;

in step S203, reference display parameters are obtained according to the first display parameters, the reference display parameters are compared with the second display parameters, and the second display parameters are adjusted according to a comparison result; and in step 205, the adjusted second display parameters are output to the second display as display parameters of the second display.

Figure 4A:
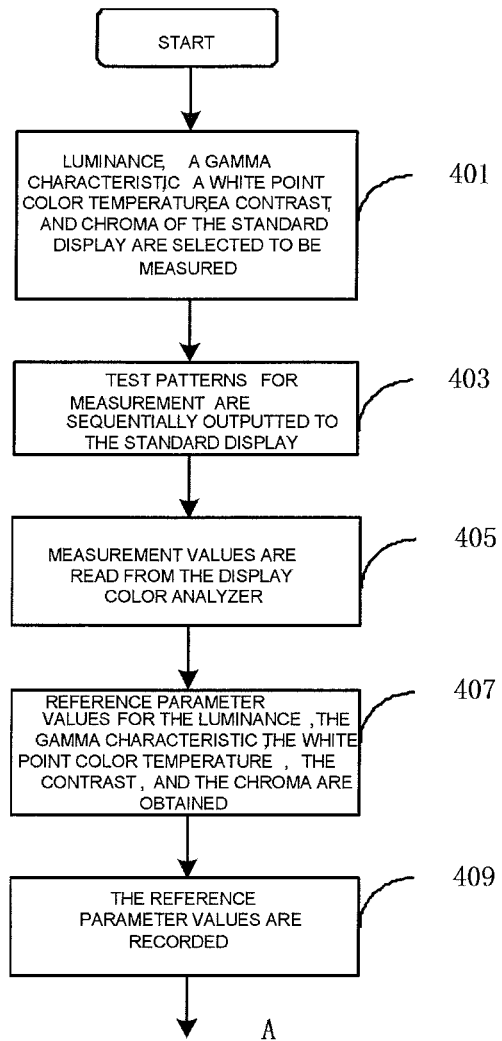
FIGS. 4A-4C are a flowchart of a method for adjusting display parameters according to another embodiment of the present disclosure.
Figure 4B:
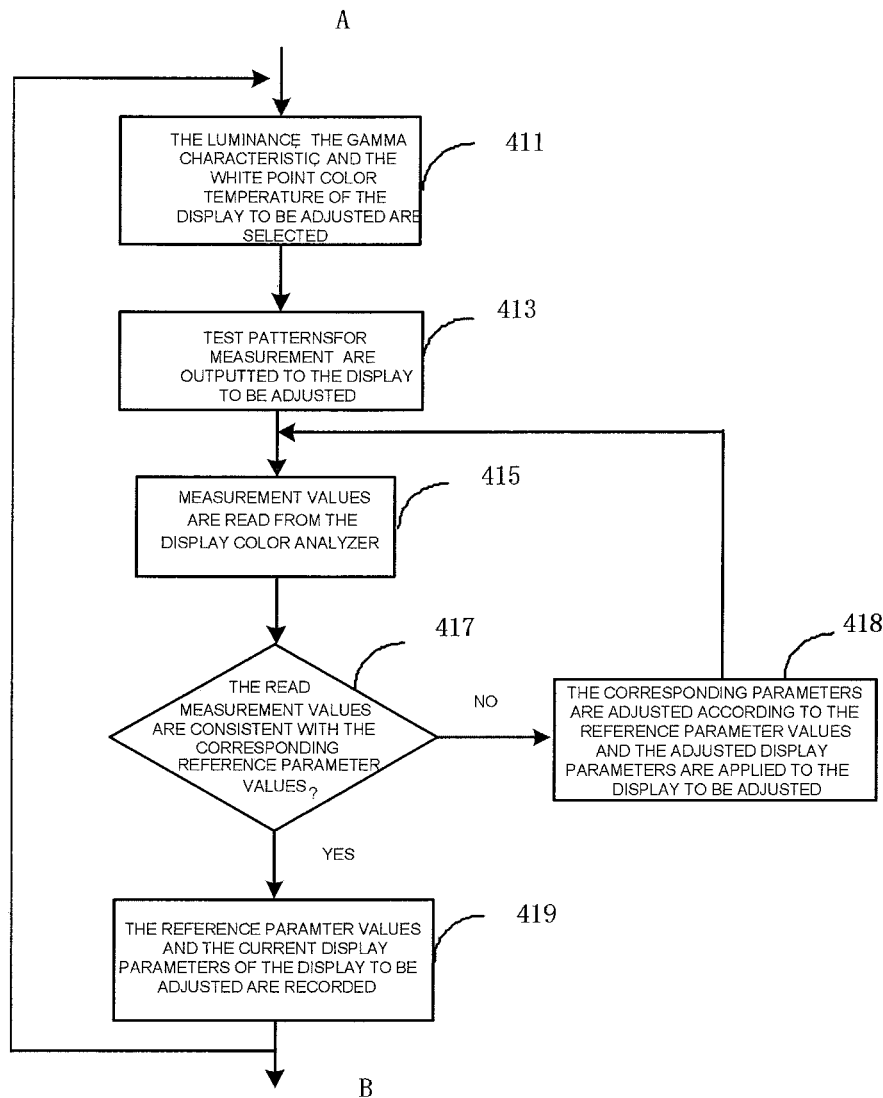
Figure 4C:
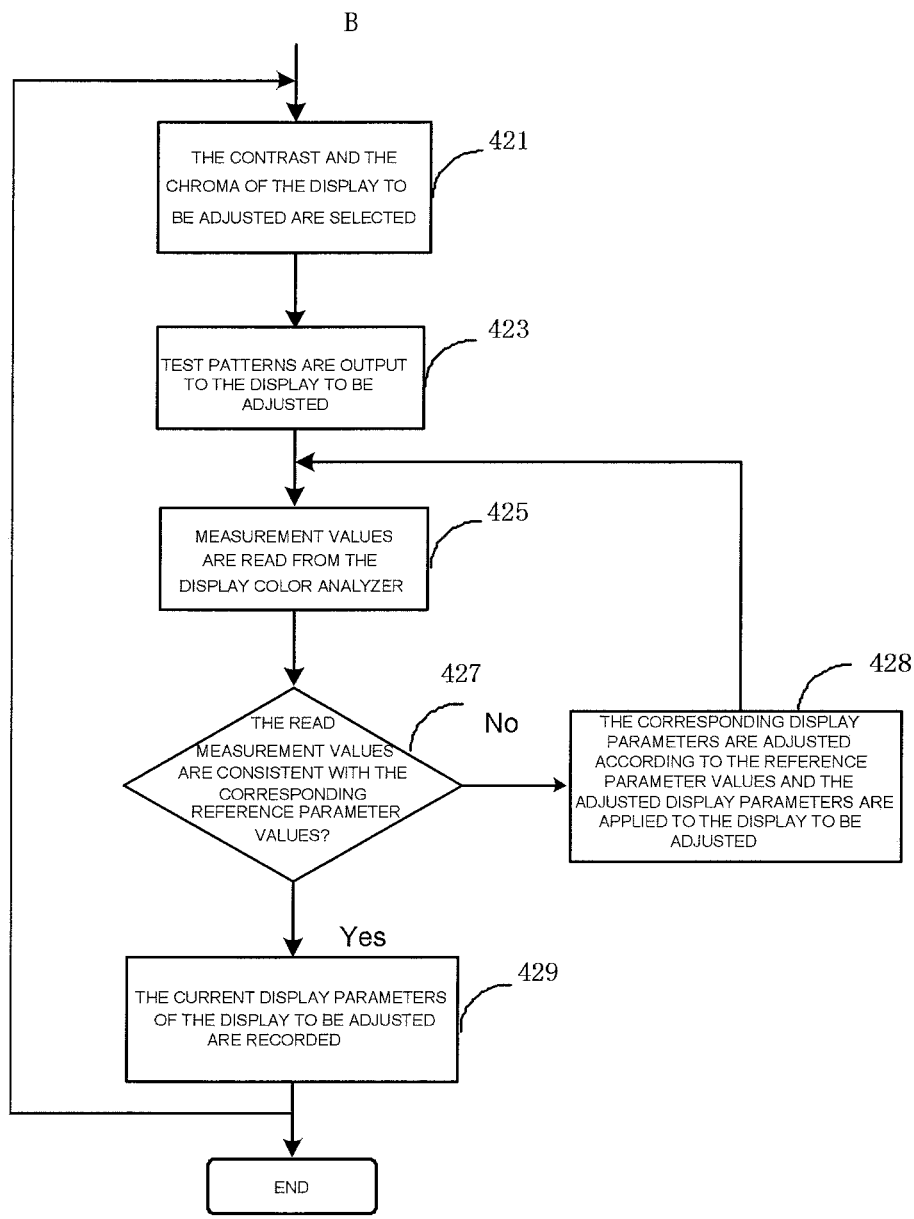

FIGS. 4A-4C illustrate a flowchart of a method for adjusting display parameters according to another embodiment of the present disclosure. The flowchart of the method for adjusting display parameters according to an embodiment of the present disclosure will be described below with reference to FIGS. 4A-4C and FIG. 2.

FIG. 4A illustrates a flowchart of measuring display parameters of a standard display according to an embodiment of the present disclosure. Firstly, the optical measurement probe 2 of the display color analyzer 5 may be provided in a position corresponding to the center of the screen of the standard display 1. After a power supply of the reference display 1 is turned on, operations may be started after it is confirmed that for example 30 minutes or longer elapse, and the display tends to be in a stable state at this time.

In step 401, luminance, a Gamma characteristic, a white point color temperature, a contrast, and chroma of the standard display are selected to be measured.

In step 403, test patterns for measurement are sequentially outputted to the standard display 1. Preferably, under the control of the picture quality adjustment control section 9 in the main controller 8, the test image generation section 10 sequentially outputs the test pattern signals for measurement for the luminance, the Gamma characteristic, the white point color temperature, the contrast, and the chroma to the standard display 1 as the video input 3. For example, the test signals for measurement may be input through a connection such as VGA, HDMI etc. Preferably, the test patterns for the luminance and the white point color temperature may be the same, i.e., both of the test patterns are images which are 100% white. The test pattern for the Gamma characteristic comprises a luminance pattern varying from 0% to 100%. The test pattern for the contrast may be a grayscale test pattern. The test pattern for chroma may be a color test pattern. It will be understood by those skilled in the art that other test patterns known in the art can be used to obtain the corresponding display parameters of the standard display, which is not limited in the present disclosure.

Figure 5:
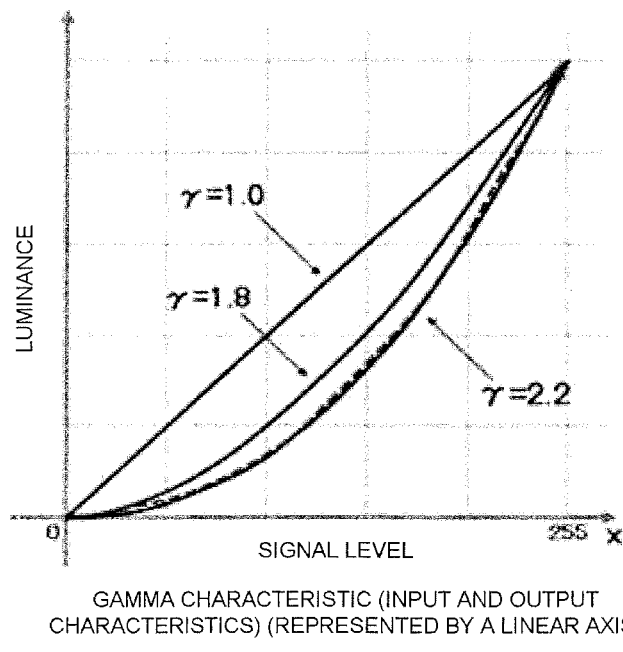
FIG. 5 illustrates a Gamma characteristic curve as an example.
Figure 6:
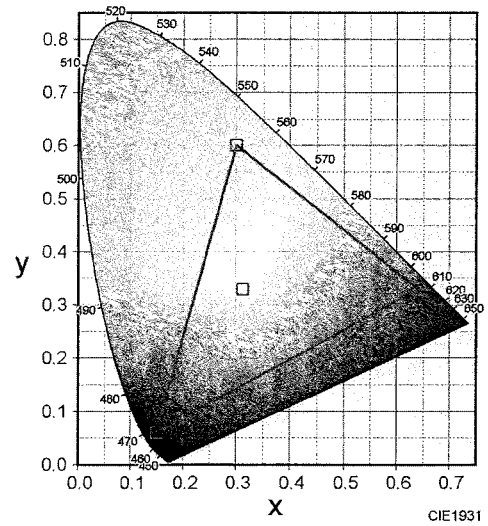
FIG. 6 illustrates a chromatic map as an example.

In step 405, measurement values are read from the display color analyzer 5. The display color analyzer 5 is connected to the standard display 1 through the probe 2 to receive a feedback for the test patterns from the standard display 1 and obtain corresponding display parameters. Specifically, the display color analyzer 5 may obtain measurement values for the luminance and the white point color temperature, obtain a Gamma characteristic diagram for the luminance pattern varying from 0% to 100% (for example, see FIG. 5), obtain a luminance level value for the contrast, and obtain a chroma value for the chroma (for example, see FIG. 6). The resulting various measurement values or characteristics diagram may be displayed on screen.

In step 407, reference parameter values for the luminance, the Gamma characteristic, the white point color temperature, the contrast, and the chroma are obtained. Specifically, the picture quality adjustment control section 9 receives various measurement values from the color analyzer 5 and determines set values of the luminance level, the Gamma level, and the white point color temperature respectively according to the received various measurement values. The set values are values which are close to the measurement values and conform to relevant specifications. For example, if the measured luminance level is 520 cd/m$^2$, a reference parameter value for the luminance level may be set to 500 cd/m$^2$. The Gamma characteristic may be set to 1.8 or 2.2 according to the measured Gamma curve. A reference parameter value for the white point color temperature may be set to 6500 k, 9300 k, or 12000 k according to the measured white point color temperature. The received measurement values may be directly used for the contrast and the chroma.

In step 409, the resulting reference parameter values are recorded. The picture quality adjustment control section 9 records the resulting various reference parameter values in the recording section 11.

Next, a flowchart of setting display parameters of the display to be adjusted will be described with reference to FIGS. 4B and 4C. FIGS. 4B and 4C illustrate a flowchart of setting display parameters of the display to be adjusted according to an embodiment of the present disclosure. Firstly, the optical probe 2 of the display color analyzer 5 may be provided at a position corresponding to the center of the screen of the display to be adjusted 4. After a power supply of the display to be adjusted 4 is turned on, operations may be started after it is confirmed that for example 30 minutes or longer elapse, and the display is in a more stable state at this time.

With reference to FIG. 4B, when luminance, a Gamma characteristic, and a white point color temperature are adjusted, the luminance, the Gamma characteristic, and the white point color temperature of the display to be adjusted 4 are selected to be set in step 411.

In step 413, test patterns for measurement are sequentially outputted to the display to be adjusted 4. Preferably, under the control of the picture quality adjustment control section 9 in the main controller 8, the test image generation section 10 sequentially outputs the test pattern signals for measurement for the luminance, the Gamma characteristic, and the white point color temperature to the display to be adjusted 4 as the video input 3. Similarly, the test signals for measurement may be input through a connection such as VGA, HDMI etc. Preferably, the test patterns for the luminance and the white point color temperature may be the same as those of the standard display 1, i.e., both of the test patterns are images which are 100% white. The test pattern for the Gamma characteristic comprises a luminance pattern varying from 0% to 100%. It will be understood by those skilled in the art that other test patterns known in the art can be used to obtain the current corresponding display parameters of the display to be adjusted 4, which is not limited in the present disclosure.

In step 415, measurement values are read from the display color analyzer 5. The display color analyzer 5 is connected to the display to be adjusted 4 through the optical probe 2 to receive a feedback for the test patterns from the display to be adjusted 4 and obtain corresponding display parameters. Specifically, the display color analyzer 5 may obtain measurement values for the luminance and the white point color temperature, and obtain a Gamma characteristic diagram for a luminance pattern varying from 0% to 100%.

In step 417, a determination is made as to whether the read measurement values are consistent with the corresponding reference parameter values. The picture quality adjustment control section 9 receives respective measurement values from the color analyzer 5 and compares the received measurement values with the corresponding reference parameter values stored in the recording section 11. If they are consistent, the method continues to step 419, and if they are inconsistent, the method continues to step 418.

In step 419, the current display parameters of the display to be adjusted 4 are recorded. Specifically, the picture quality adjustment control section 9 records the current luminance value, the current Gamma characteristic, and the current white point color temperature value of the display to be adjusted 4 in the recording section 11 respectively. The current luminance value, the current Gamma characteristic and the current white point color temperature value of the display to be adjusted 4 may be recorded in a form of a lookup table in association with the corresponding reference parameter values.

In step 418, the corresponding display parameters are adjusted according to the reference parameter values and the adjusted display parameters are applied to the display to be adjusted 4. Specifically, for the luminance, a lower limit of the parameter may be used initially, a parameter adjustment value of the luminance may be incrementally increased, and the adjusted luminance value may be applied to the display to be adjusted 4 through the image engine 6. Thereafter, steps 415-417 are performed repeatedly until a feedback consistence with the reference parameter value of the luminance is obtained. In this case, a current luminance level may be displayed on the screen. For the Gamma characteristics, a RGB-Offset preset value Gamma 1.0 may be initially used, a parameter adjustment value of the luminance may be incrementally increased, and the adjusted RGB-Offset preset value is applied to the display to be adjusted 4 through the image engine 6. Thereafter, steps 415-417 are performed repeatedly until a feedback consistence with the reference parameter value of the RGB-Offset preset value is obtained. In this case, a current Gamma curve may be displayed on the screen. Adjustment may be made for the R, G and B signals respectively. For the white point color temperature, according to a comparison with a reference parameter value of the white point color temperature, if a color temperature of the display to be adjusted is low, R-Gain is decreased and GB-Gain is increased. On the contrary, if the color temperature of the display to be adjusted is high, the color temperature of the display is lowered, R-Gain is increased and GB-Gain is decreased, and the adjusted white point color temperature is applied to the display to be adjusted 4 through the image engine 6. Thereafter, steps 415-417 are performed repeatedly until the set value of the white point color temperature is reached. In this case, a current white point color temperature may be displayed on the screen.

With reference to FIG. 4C, in step 421, the contrast and the chroma of the display to be adjusted 4 are selected.

In step 423, the test patterns for measurement are sequentially output to the display to be adjusted 4. Preferably, under the control of the picture quality adjustment control section 9 in the main controller 8, the test image generation section 10 sequentially outputs the test pattern signals for measurement for the contrast and the chroma to the display to be adjusted 4 as the video input 3. Similarly, the test signals for measurement may be input through a connection such as VGA, HDMI etc. Preferably, the test patterns for the contrast and the chroma may be the same as those for the standard display 1, i.e. the test pattern for the contrast may be a grayscale test pattern, and the test pattern for the chroma may be a color test pattern. It will be understood by those skilled in the art that other test patterns known in the art may be used to obtain the current corresponding display parameters of the display to be adjusted 4, which is not limited in the embodiments of the present disclosure.

In step 425, measurement values are read from the display color analyzer 5. The display color analyzer 5 is connected to the display to be adjusted 4 through the probe 2 to receive a feedback for the test patterns from the display to be adjusted 4, and obtain the corresponding display parameters. Specifically, the display color analyzer 5 may obtain measurement values for the contrast and the chroma.

In step 427, a determination is made as to whether the read measurement values are consistent with the corresponding reference parameter values. The picture quality adjustment control section 9 receives the various measurement values from the color analyzer 5 and compares the received measurement values with the corresponding reference parameter values stored in the recording section 11. If they are consistent, the method continues to step 429, and if they are inconsistent, the method continues to step 428.

In step 429, the current display parameters of the display to be adjusted 4 are recorded. Specifically, the picture quality adjustment control section 9 records the current contrast value and the current chroma value of the display to be adjusted 4 in the recording section 11 respectively. The current contrast value and the current chroma value of the display to be adjusted 4 may be recorded in association in a form of a lookup table with the corresponding reference parameter values.

In step 428, the corresponding display parameters are adjusted according to the reference parameter values and the adjusted display parameters are applied to the display to be adjusted 4. Specifically, for the contrast, the adjusted contrast value may be applied to the adjustment display 4 through the image engine 6. Thereafter, steps 425-427 are performed repeatedly until a feedback consistence with the reference parameter value of the contrast is obtained. In this case, a current contrast level may be displayed on the screen. For the chroma, the adjusted chroma value may be applied to the adjustment display 4 through the image engine 6. Thereafter, steps 425-427 are performed repeatedly until a feedback consistence with the reference parameter value is obtained. In this case, a current chroma value may be displayed on the screen. The display parameters may be converted into Color-Gain/Tint parameter values.

It will be understood by those skilled in the art that the above-described method is merely an example and that an order of operations of the methods can be varied as desired. For example, the adjustment of the various display parameters of the display 4 to be adjusted may be performed in any order without following an order of the luminance value, the Gamma characteristic, the white point color temperature value, the contrast, and the chroma. In addition, after obtaining a reference parameter value of the standard display, a display parameter of the display to be adjusted may be immediately adjusted for the parameter value, and after the adjustment of the display parameters is completed, a next display parameter is obtained and adjusted. Further, the related display parameters are not limited to the luminance value, the Gamma characteristic, the white point color temperature value, the contrast and the chroma etc. described here, and may be other display parameters known in the art.

According to another embodiment of the present disclosure, there is also provided a display apparatus comprising: a display; and an apparatus for adjusting display parameters, including: an input unit configured to receive first display parameters from a standard display; a control unit configured to obtain reference display parameters according to the first display parameters, compare the reference display parameters with second display parameters of the display, and adjust the second display parameters according to a comparison result; and an output unit configured to apply the adjusted second display parameters to the display as display parameters of the display.

Figure 7:
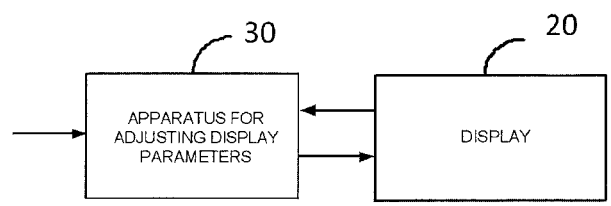
FIG. 7 illustrates a block diagram of a display apparatus according to an embodiment of the present disclosure.

As shown in FIG. 7, the display apparatus according to the present disclosure may comprise a display 20 and an apparatus 30 for adjusting display parameters. The display 20 may have a structure and functions similar to those of the second display (display 4 to be adjusted) according to an embodiment of the present disclosure described above. The apparatus 30 for adjusting display parameters may have a structure and functions similar to those of the apparatus for adjusting display parameters according to an embodiment of the present disclosure described above, except that the apparatus for adjusting display parameters and the display to be adjusted are separated in the above-described embodiment, but in the present embodiment of the present disclosure, the display 20 and the apparatus 30 for adjusting display parameters are integrated together so as to be more convenient for operation. It will be understood by those skilled in the art that both the separated and integrated structures are within the scope of the embodiments of the present disclosure.

It should be illustrated that the subject matter claimed in the present disclosure is not limited to the scope of the specific embodiments described herein. For example, some embodiments may be in a form of hardware, for example, for operations on a device or a combination of devices, while other embodiments may be in a form of software and/or firmware. Similarly, although the claimed subject matter in this respect is not limited in scope, some embodiments may include one or more articles, such as a storage medium or storage media. The storage medium such as a CD-ROM, a computer disk, a flash memory etc., may store instructions thereon, which when executed by a system such as a computer system, a computing platform, or another system, may cause the processor to perform operations according to the claimed subject matter, for example, one of the above-described embodiments. One possible way is that the computing platform may comprise one or more processing units or processors, one or more input/output devices (e.g., a display, a keyboard and/or a mouse), and one or more memories (e.g., a static random access memory, a dynamic random access memory, a flash memory, and/or a hard driver).

According to the embodiments of the present disclosure, the display picture quality of the display device can be automatically adjusted without an operation of a professional technician, and there are advantages of high speed and high accuracy.

The above specific embodiments further describe the purposes, technical solutions and beneficial effects of the present disclosure in detail. It should be understood that the above description is merely specific embodiments of the present disclosure, instead of limiting the present disclosure. Any modification, equivalent substitution, improvement etc., made within the spirit and principle of the present disclosure, should be included in the protection scope of the present disclosure.

I claim:

1. An apparatus for adjusting a display parameter of a second display, comprising a processor configured to:
  generate at least one test pattern according to a type of the display parameter of the second display;
  transmit the test pattern to a first display and the second display respectively;
  display the test pattern on the first display and the second display respectively;
  obtain a reference display value according to a first display measurement value, compare the reference display value with a second display measurement value, and adjust the display parameter for the second display according to a comparison result to obtain a adjusted display parameter, wherein the first display measurement value is measured by a display color analyzer while the test pattern being displayed on the first display, and the second display measurement value is measured by the display color analyzer while the test pattern being displayed on the second display using the display parameter of the second display; and
  output the adjusted display parameter to the second display so as to cause the second display to display images using the adjusted display parameter;
  wherein the reference display value is a display parameter close to a display parameter of the first display among display parameters conforming to a relevant display specification;
  wherein the processor is further configured to adjust the display parameter of the second display so that the second display measurement value measured by the display color analyzer while the test pattern being displayed on the second display using the adjusted display parameter is the same as the reference display value;
  wherein the reference display value comprises at least one of luminance, a white point color temperature, a Gamma characteristic curve, a contrast, and chroma;
  wherein the test pattern comprises at least one of a test pattern for luminance, a test pattern for a white point color temperature, a test pattern for a Gamma characteristic, and a test pattern for a contrast, and a test pattern for chroma;
  wherein the test pattern for luminance and the test pattern for the white point color temperature comprise images which are 100% white, the test pattern for the Gamma characteristic comprises a luminance pattern varying from 0 grayscale to highest grayscale, and the test pattern for the contrast comprises a grayscale test;
  wherein the display parameter comprises the Gamma characteristics, and
  the processor is further configured to i. display the test pattern for the Gamma characteristics by the second display, ii. apply a RGB-Offset preset value Gamma 1.0 initially the second display to obtain a feedback, iii. compare the feedback with a reference parameter value of the RGB-Offset value preset by using the first display, iv. increase a parameter adjustment value of the luminance incrementally, and, v. apply the increased RGB-Offset preset value to the second display; perform iii~v repeatedly until the feedback consistence with the reference parameter value of the RGB-Offset preset value is obtained.

2. The apparatus according to claim 1, further comprising a storage apparatus having a lookup table stored therein, wherein the lookup table associatively records a correspondence relationship between the reference display value and the display parameter of the first display.

3. The apparatus according to claim 1, further comprising an image engine configured to apply the adjusted display parameter to the second display.

4. The apparatus according to claim 1, wherein the processor further configured to obtain the reference display value according to feedback information for the test patterns from the first display and adjust the display parameter of the second display according to a comparison between the feedback information for the test pattern from the second display and the reference display value.

5. The apparatus according to claim 1, wherein the test pattern for chroma comprises a color test pattern.

6. The apparatus according to claim 5, wherein the display parameter further comprises the chroma, and
the processor is further configured to display the color test pattern by the second display to obtain a feedback, compare the feedback with the reference parameter value for the chroma value, adjust the chroma value until the feedback is consistent with the reference parameter value.

7. The apparatus according to claim 1, wherein the display parameter further comprises the white point color temperature, and
the processor is further configured to display the test pattern for the white point color temperature by the second display to obtain a feedback, compare the feedback with a reference parameter value of the white point color temperature, decrease R-Gain of the color temperature and increase the GB-Gain if the feedback is lower than the reference parameter value, or decrease GB-Gain of the color temperature and increase the R-Gain if the feedback is greater than the reference parameter value, until the feedback is consistent with the reference parameter value of the white point color temperature.

8. A display apparatus, comprising:
a display; and
a processor configured to receive a first display measurement value from a standard display, obtain a reference display value according to the first display measurement value, compare the reference display value with a second display measurement value of the display, adjust a second display parameter of the display according to a comparison result, and cause the display to display images using the adjusted display parameters;
wherein the first display measurement value is measured by a display color analyzer while at least one test pattern being displayed on the standard display, and the second display measurement value is measured by the display color analyzer while the test pattern being displayed on the display using the display parameter of the display; and
wherein the reference display value is a display parameter close to a display parameter of the standard display among display parameters conforming to a display specification;
wherein the display parameter of the display is adjusted so that the second display measurement value measured by the display color analyzer while the test pattern being displayed on the display using the adjusted display parameter is the same as the reference display value;
wherein the test pattern comprises at least one of a test pattern for luminance, a test pattern for a white point color temperature, a test pattern for a Gamma characteristic, and a test pattern for a contrast, and a test pattern for chroma;
wherein the test pattern for luminance and the test pattern for the white point color temperature comprise images which are 100% white, the test pattern for the Gamma characteristic comprises a luminance pattern varying from 0 grayscale to highest grayscale, and the test pattern for the contrast comprises a grayscale test pattern;
wherein the display parameter comprises the Gamma characteristics, and
the processor is further configured to i. display the test pattern for the Gamma characteristics by the second display, ii. apply a RGB-Offset preset value Gamma 1.0 initially the second display to obtain a feedback, iii. compare the feedback with a reference parameter value of the RGB-Offset value preset by using the first display, iv. increase a parameter adjustment value of the luminance incrementally, and v. repeatedly until the feedback consistence with the reference parameter value of the RGB-Offset preset value is obtained.

9. A method for adjusting a display parameter of a second display, comprising steps of:
generating at least one test pattern according to a type of the display parameter of the second display;
transmitting the test pattern to a first display and the second display respectively; obtaining a reference display value according to a first display measurement value, comparing the reference display value with a second display measurement value, adjusting the display parameter for the second display according to a comparison result to obtain a adjusted display parameter; and
outputting the adjusted display parameter to the second display so as to cause the second display to display images using the adjusted display parameter;
wherein the first display measurement value is measured by a display color analyzer while the test pattern being displayed on the first display, and the second display measurement value is measured by the display color analyzer while the test pattern being displayed on the second display using the display parameter of the second display;
wherein the reference display value is a display parameter close to a display parameter of the first display among display parameters conforming to a display specification;
wherein the method further comprises adjusting the display parameter of the second display so that the second display measurement value measured by the display color analyzer while the test pattern being displayed on the second display using the adjusted display parameter is the same as the reference display value;

wherein the reference display value comprises at least one of luminance, a white point color temperature, a Gamma characteristic curve, a contrast, and chroma;

wherein the test pattern comprises at least one of a test pattern for luminance, a test pattern for a white point color temperature, a test pattern for a Gamma characteristic, and a test pattern for a contrast, and a test pattern for chroma;

wherein the test pattern for luminance and the test pattern for the white point color temperature comprise images which are 100% white, the test pattern for the Gamma characteristic comprises a luminance pattern varying from 0 grayscale to highest grayscale, and the test pattern for the contrast comprises a grayscale test pattern;

wherein the display parameter comprises the Gamma characteristics, and the method further comprises:
i. displaying the test pattern for the Gamma characteristics by the second display,
ii. applying a RGB-Offset preset value Gamma 1.0 initially the second display to obtain a feedback,
iii. comparing the feedback with a reference parameter value of the RGB-Offset value preset by using the first display,
iv. increasing a parameter adjustment value of the luminance incrementally,
v. applying the increased RGB-Offset preset value to the second display; and performing iii~v repeatedly until the feedback consistence with, the reference parameter value of the RGB-Offset preset value is obtained.

10. The method according to claim 9, further comprising recording a correspondence relationship between the reference display value and the display parameter of the first display.

11. The method according to claim 9, wherein the reference display value are obtained according to feedback information for the test pattern from the first display and the display parameter of the second display is adjusted according to a comparison between the feedback information for the test pattern from the second display and the reference display value.

12. The method according to claim 9, wherein the test pattern for chroma comprises a color test pattern.

13. The method according to claim 12, wherein the display parameter further comprises the chroma, and the method further comprises:
displaying the color test pattern by the second display to obtain a feedback,
comparing the feedback with the reference parameter value for the chroma value, and
adjusting the chroma value until the feedback is consistent with the reference parameter value.

14. The method according to claim 9, wherein the display parameter is further comprises the white point color temperature, and
the method further comprises:
displaying the test pattern for the white point color temperature by the second display to obtain a feedback,
comparing the feedback with a reference parameter value of the white point color temperature, and
decreasing R-Gain of the color temperature and increase the GB-Gain if the feedback is lower than the reference parameter value, or decrease GB-Gain of the color temperature and increasing the R-Gain if the feedback is greater than the reference parameter value, until the feedback is consistent with the reference parameter value of the white point color temperature.

* * * * *